MAGNETIC RECORDER TRANSMITTER DISTRIBUTOR

Filed March 4, 1966 5 Sheets-Sheet 1

INVENTORS.
FRANCIS T. CASSIDY
DOMINICK A. INTARTAGLIA
BY Charles L. Johnson Jr.
ATTORNEY INVENTORS.
FRANCIS T. CASSIDY
BY DOMINICK A. INTARTAGLIA
Charles L. Johnson Jr.
ATTORNEY INVENTORS.
FRANCIS T. CASSIDY
BY DOMINICK A. INTARTAGLIA
Charles L. Johnson Jr.
ATTORNEY

INVENTORS.
FRANCIS T. CASSIDY
BY DOMINICK A. INTARTAGLIA
ATTORNEY

INVENTORS.
FRANCIS T. CASSIDY
BY DOMINICK A. INTARTAGLIA
Charles L. Johnson Jr.
ATTORNEY United States Patent Office 3,416,140
Patented Dec. 10, 1968

3,416,140
MAGNETIC RECORDER TRANSMITTER DISTRIBUTOR

Francis T. Cassidy, Jr. and Dominick A. Intartaglia, Brooklyn, N.Y., assignors to International Telephone and Telegraph Corporation, Nutley, N.J., a corporation of Delaware Filed Mar. 4, 1966, Ser. No. 531,893
8 Claims. (Cl. 340—172.5)

ABSTRACT OF THE DISCLOSURE

This invention teaches the use of apparatus for recording teleprinter characters in a parallel manner on magnetic drums. In this manner information is sequentially recorded in successive drum segments and read from the drum so that the first recorded message is always the first message that is read from the drum. In this manner information may be recorded at one speed and read at a different speed, the record and read speeds not being wholly dependent upon the rotative velocity of the magnetic drum.

This invention relates to telecommunications and in particular to apparatus for temporarily storing and forwarding teleprinter information.

During the transmission of information by teleprinter apparatus it is often necessary to temporarily detain information for later transmittal. In the past a common means of doing this has been by the use of punched paper tape whereby the information to be temporarily stored is punched into tape in the conventional five-element code. Other means of accomplishing the temporary storage of teleprinter messages has been by the serial recording on magnetic drums as shown in Patent No. 2,932,688.

This invention teaches the use of apparatus for recording teleprinter characters in a parallel manner on magnetic drums. In this manner information is sequentially recorded in successive drum segments and read from the drum so that the first recorded message is always the first message that is read from the drum. In this manner information may be recorded at one speed and read at a different speed, the record and read speeds not being wholly dependent upon the rotative velocity of the magnetic drum.

It is therefore an object of this invention to provide an improved telecommunication apparatus.

It is a feature of this invention that the teleprinter characters are recorded in a parallel manner on a magnetic drum surface on a first-in first-out basis.

It is another feature of this invention that the speed of recording and reading need not be identical.

These and other objects and features of the invention will become apparent from the following description and accompanying drawings in which.

The invention is directed primarily to the telecommunication system in which intelligence is recorded in the form of successive unspaced longitudinal magnetization of either one or two kinds, which can conveniently be designated "0" or "1." It is seen that intelligence may be conveniently recorded in binary digital code though other code forms are possible. The recording arrangement applied to the convention used in this specification is of "1" for a "space" telegraph element and "0" for a "mark" element. The elements are associated with the five variable elements of a telegraph signal in standard five unit constant total permutation code, the first variable element being stored in 1, the second in 2, and so forth. These elements are transmitted in serial fashion with a start signal at the beginning of each character.

In this invention teletypewriters periodically transmit to the device which records the characters on a magnetic drum and later reads out the recorded characters in the same sequential order as fed to the device.

Figure 1:
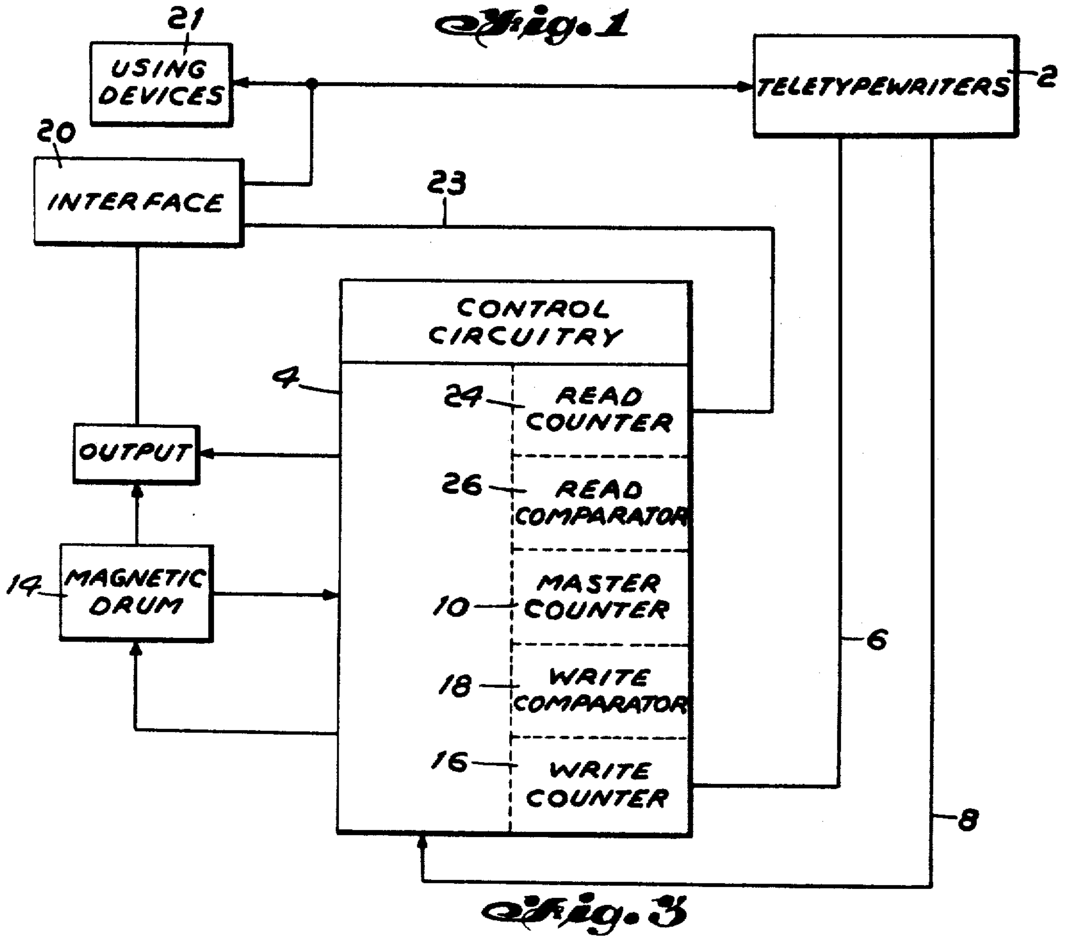
FIG. 1 is a block diagram illustrative of the invention.
Figure 2:
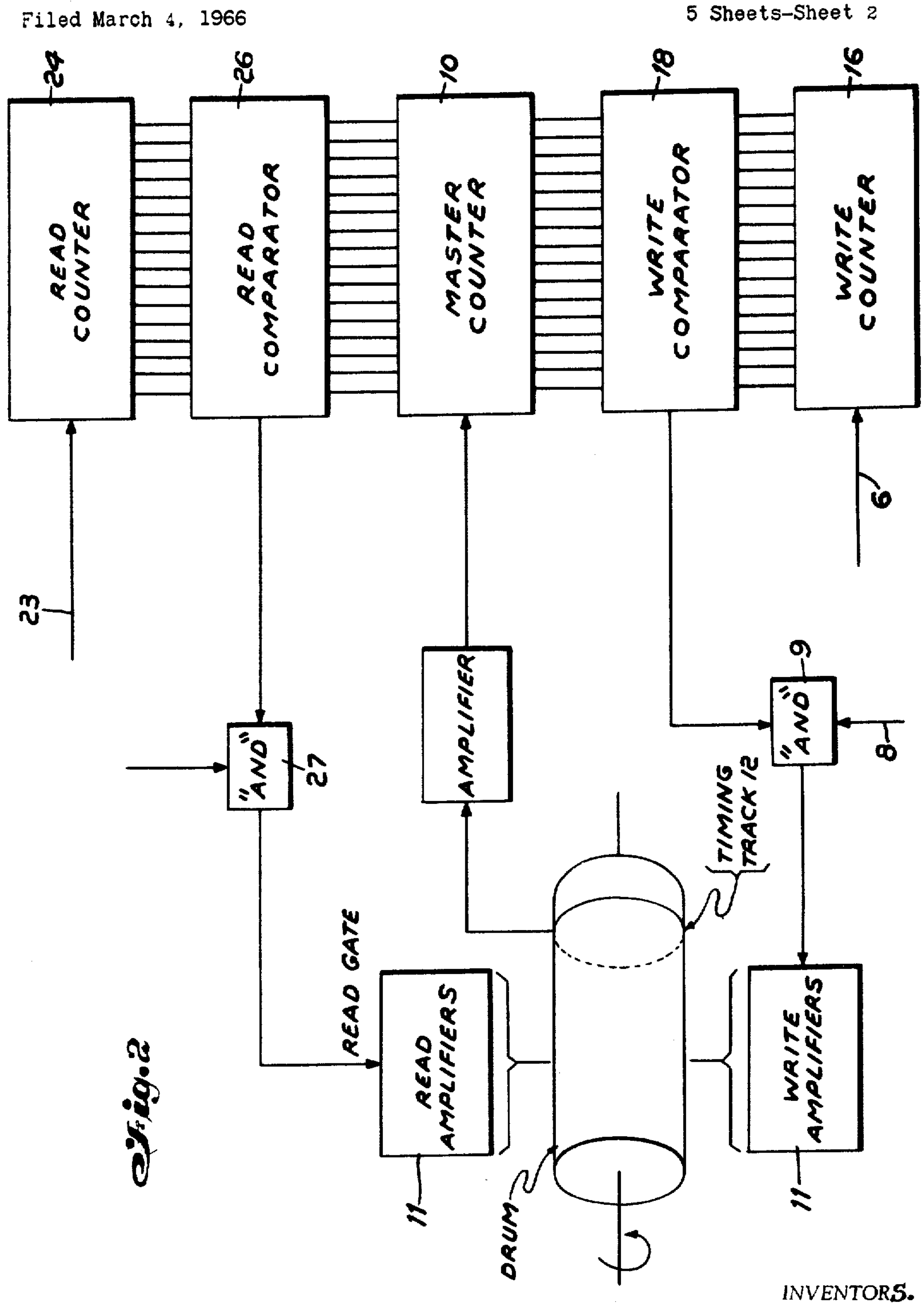
FIG. 2 is a schematic block diagram of the invention.

Referring now to FIGS. 1 and 2 the teletypewriters 2 transmit characters, representative of letters, numbers or other information to the control circuitry 4 of the device. The master counter 10 continuously monitors the timing track 12 on the magnetic drum 14 so as to continuously provide a count indicative of the segments on the drum currently in read-record position. The write counter 16 counts the number of characters written on the drum. The write comparator 18 continuously compares the master count with the write count to provide a write-comparator signal upon the coincidence of the two counts, so as to record the character in the proper segment of the drum.

The multiplexer or output interface 20 acts to transmit information from the magnetic drum to teletypewriters and other using devices. When a character is desired the output interface provides a signal on conductor 23 which activates the read comparator 26. The read comparator 26 continuously monitors a read counter and a master counter so as to provide a read-comparator signal upon the coincidence of the read counter and master counter counts, so as to read out the character from the proper drum segment.

The read comparator and write comparator signals control the recording of information from the teletypewriters to the magnetic drum surface 14 and the read-out of characters from the drum 14 to the multiplexer 20.

In this manner incoming signals are recorded in sequential segments of the drum in parallel bit form, and are read out in the same sequence.

Although information is accepted in serial bit form it is recorded on the drum in a parallel manner. In this way the start pulse of the Teletype information may be advantageously utilized for gating purposes, whereas if information were to be presented serially a special type gating arrangement would be necessary.

Another advantage is seen to be that the maximum speed information may be written on or read from the drum, using one head for reading and writing, is determined by the speed of the drum. For a drum rotating at a speed of 3600 r.p.m. the serial form would set an upper speed limit of 16.7 milliseconds information pulse (60 baud); whereas the upper speed limit would be 450 baud for conventionally used 7.5 unit code when incorporating the parallel form. There is thus seen that a more rapid recording may be realized by the use of the parallel system.

The system includes a master counter which is used to discriminate between positions along the circumference of the drum. Separate read and write counters are used to determine the segment on the circumference of the drum where the next bit of information is to be extracted from or written on. Comparators are employed as gates which are activated when the master counter is at the same count as either the read or write counter. Referring now to FIG. 2 assume for the time being that the master counter 10 is capable of distinguishing and assigning a binary number to each position along the drum circumference, which is discretely divided into 3,000 segments, in the preferred embodiment. The two additional binary counters 16 and 24 have their binary counts compared with the master counter means of diode comparators 18 and 26.

Assume the write counter 16 is initially preset at the binary count of "1." The write comparator 18 comparing the "1" binary count with the master counter indicates, by means of a write-comparator output pulse, an equality every 16.7 msec., since the master is counting from 0 to 2999 and resets. However, by means of the "AND" gate 9 shown in FIG. 2 the write amplifiers do not receive the signal to record, since a clear-to-write signal on line 8 from the incoming information is not present. With the presentation of an incoming character, the AND gate is enabled, thereby allowing the information to be recorded in the appropriate segment of the drum. As soon as this is accomplished, which may take as long as one revolution of the drum, write counter 16 is advanced to a count of two. When the write-comparator indicates an equality of the one count the write amplifiers 11 receive the signal to record. Since this signal is given simultaneously with the binary count of "one" of the master counter, it is assured that the recording on the drum 14 has been made at the "one" position segment of the drum circumference. With the recording of the next incoming character, the write counter 16 is now stepped up to the binary count of 3. Following the same line of reasoning as above it is seen that this information is recorded at the "two" position segment on the drum circumference. In this way, it can be assured that each new character will be recorded in the drum segment immediately following the last segment in which a character is recorded.

Figure 5:
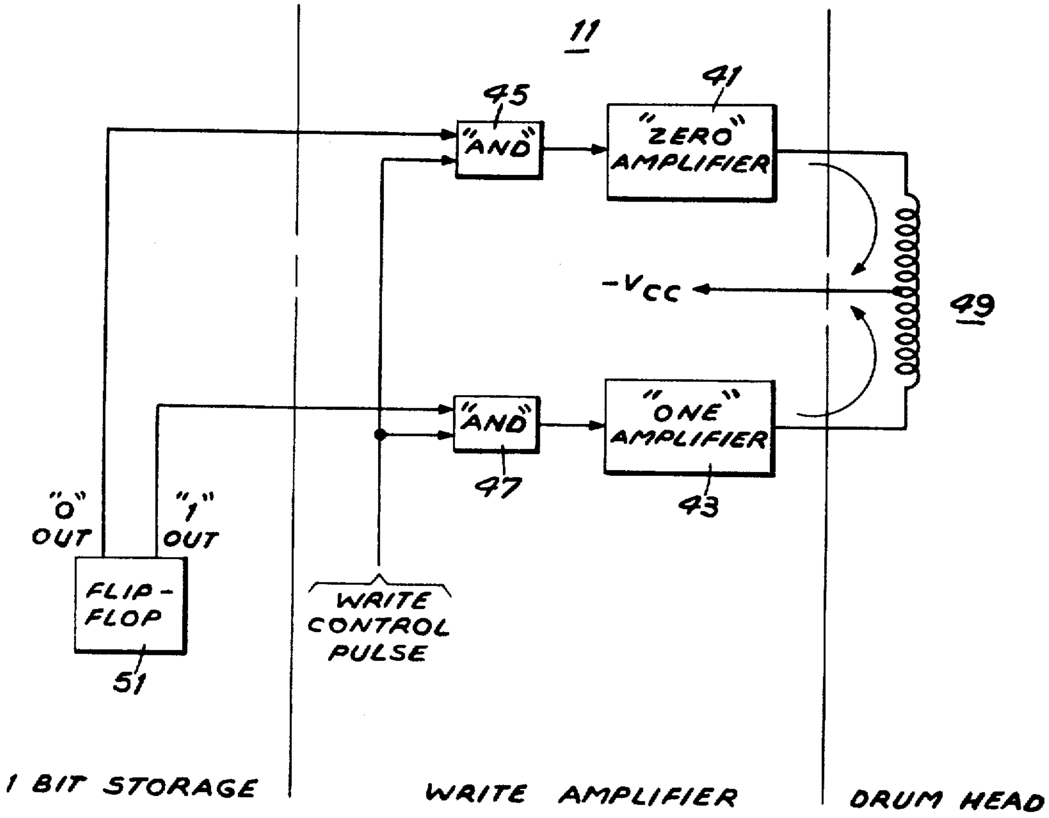
FIG. 5 is a schematic of the write amplifier.

Keeping in mind that information is to be stored on the drum on a per character basis, in parallel, it is clear that five of the circuits in FIG. 5 are necessarily employed to record the five teleprinter character signal elements. The particular character to be written on the drum is represented by the conditions or states of the five-1-bit storage flip-flops. It is noted that every character written on the drum will have each of its bits on five separate tracks of the drum. By having the write control pulse applied to all five write amplifiers simultaneously, it is assured that each bit of the character written on the drum is recorded on its respective track at the same position along the drum circumference.

Figure 6:
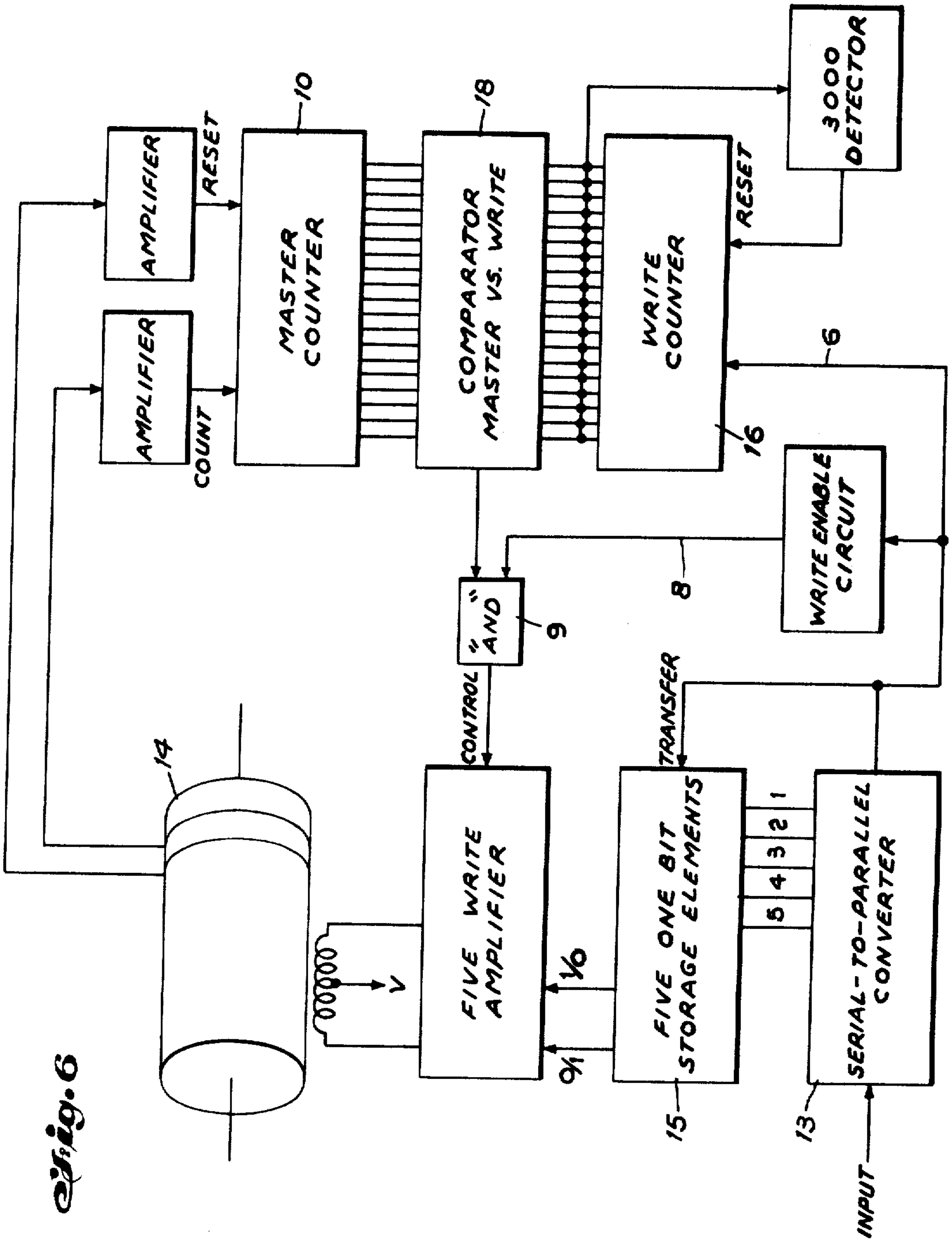
FIG. 6 is a schematic block diagram of the write control circuitry.

As shown in more detail in FIG. 6, sequential information is accepted and immediately fed into a serial to parallel converter 13. The resulting parallel information is automatically transferred into storage 15 on a per character basis. Corresponding to each transfer of a character into storage 15, is the activation of the write enable circuit 17. The output of this circuit yields the current to produce the write signal on conductor 8. The write comparator yields an output pulse with each revolution of the drum. Also shown in FIG. 6 is a 3000 detect gate employed to automatically reset the write counter, when it reaches the count of 3000.

It is thus seen that the coincidence of the clear-to-write and write comparator signals gates the AND gate 9 to produce a write control signal to allow the write amplifier means 19 to record the character bits from the storage means 15 on the magnetic drum 14 in a bit-parallel manner.

Figure 7:
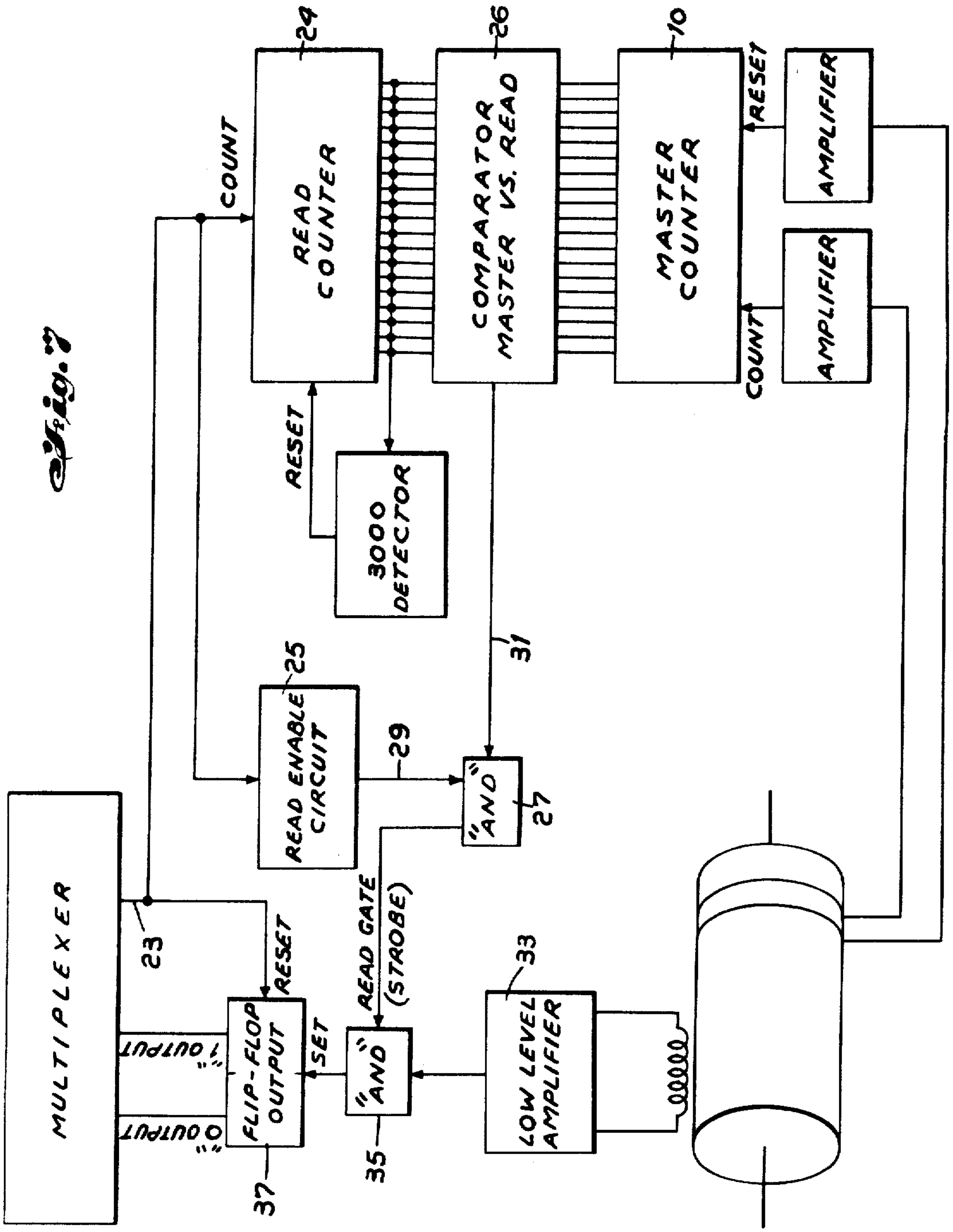
FIG. 7 is a schematic block diagram of the read-out circuitry.

A more detailed description of the operation of the reading apparatus will now be given by reference to FIGS. 1, 2 and 7. Applying the same reasoning and operation as described above, each character to be read off the drum will be extracted from the position immediately following the last segment that had been read from.

A multiplexer or other using device 21 may initiate the read operation by applying a signal to the read counter 24 via conductor 23. Coincidence of the master counter 10 count with the control circuitry count will generate a read-comparator signal by the read comparator 26. The read enable monostable 25 will generate a clear-to-read signal from the read pulse on 23 so the AND gate 27 will generate a read strobe signal upon the coincidence of the clear-to-read signal on conductor 29 and the read-comparator signal on conductor 31. The read strobe signal output of AND gate 27 allows the signal from the drum, amplified by amplifier 33 to pass AND gate 35 to the output flip-flop 37 and from there to the using device.

It is thus seen that the output of the using device consists of characters in successive order from adjacent segments of the drum.

It is important to note that the readout does not have to be at the same rate as the input recording, thus adding greatly to the versatility of the system.

Figure 3:
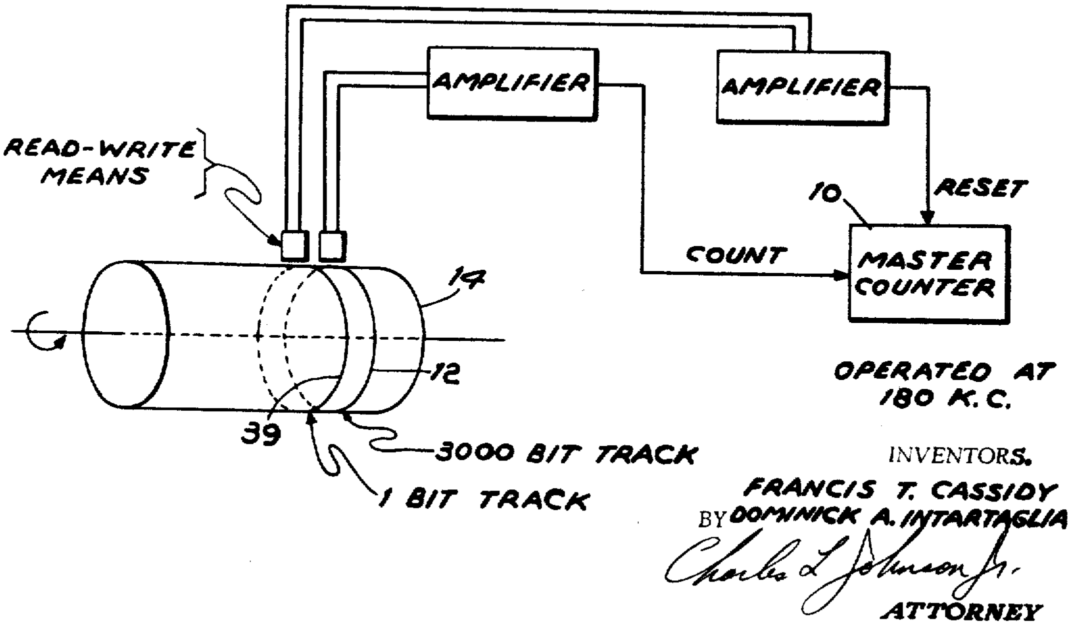
FIG. 3 is a schematic block diagram of the timing arrangement.
Figure 4:
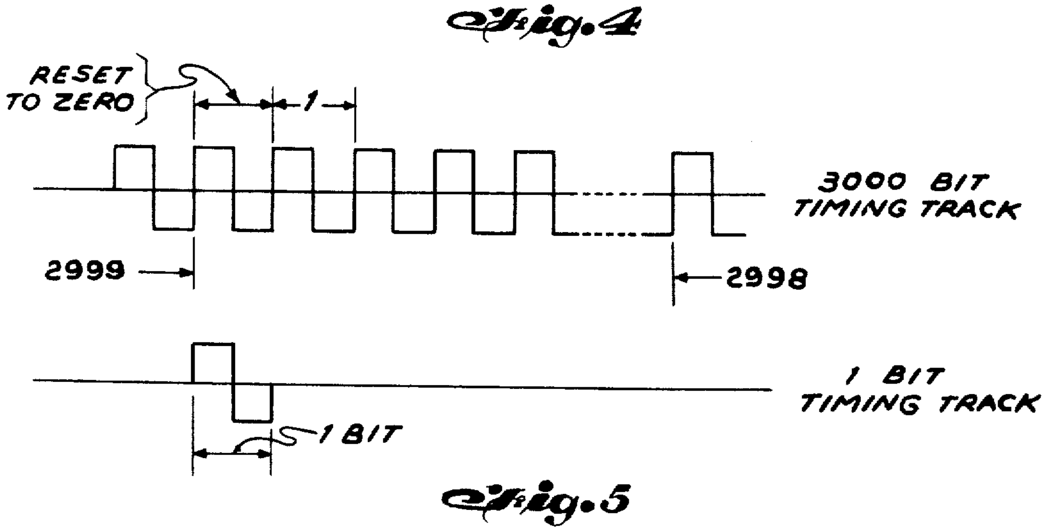
FIG. 4 illustrates the waveforms of the timing arrangement.

Turning now to some of the details of the preferred embodiment of the invention it should be noted in relation to timing that by making use of another track on the drum which has only one bit written on it, it is possible to reset a counter which is counting the cells of the 3000 bit track. Thus the counter will continually count from 0 to 2999 and reset over and over again. This is illustrated by FIG. 3. FIGURE 4 shows the relationship existing between the original pulse and the master pulse. The original pulse is necessary in order to insure the same reference or starting pulse. The master counter 10 will count each succeeding pulse and advance to a count of 2999 before the pulse of the one bit track 39 again resets it to zero.

The manner of recording employed is known as phase modulation. This method insures that there will be one reversal of flux in every cell time. The direction of flux is determined by the set of the associated flip-flop in the five bit storage 15. At the middle of the cell time the storages 15 are complemented or inverted, so that the direction of the write flux on the drum is reversed from its original direction. Thus a flux reversal occurs in the middle of each cell time. This method insures a sufficient $d\phi/dt$ even when writing successive ones or zeros.

The write amplifiers pass current through the drum head in one direction for writing in a "one" (mark condition) and in the other direction for writing in a "zero" (space condition).

As shown in FIG. 5 a write amplifier 11 actually consists of two separate transistor amplifiers 41 and 43 which share the same supply voltage. In the absence of an output from the "AND" gates 45 and 47, these amplifiers act as open switches, thereby preventing current from being passed through the drum head 49. Since each "AND" gate is connected to an output of the same flip-flop 51, it is insured that both of these gates 45 and 47 cannot be activated simultaneously. Therefore, with the presentation of a "write control pulse," only one of the "AND" gates 45 or 47 will yield an output. The decision as to which of the "AND" gates will be activated is determined by the state or condition of the storage flip-flop 51. By applying an output of an "AND" gate to one of the amplifiers, the output transistor is turned full-on, thereby allowing current to pass through the drum head. Since the transistor supply voltage is connected to the center-tap of the head coil, it is obvious that depending upon which of the amplifiers is turned on, current will be passed through the head in one direction or another, thereby magnetically writing a "one" or a "zero" on the drum surface.

From the above it is seen the object of the invention has been realized by use of the features as described and illustrated. It is to be clearly understood that this description is made only by way of example and not as a limitation on the scope of the invention.

What is claimed is:

1. Communication apparatus comprising a using device including a plurality of teletypewriters for communicating by means of a plurality of serially arranged electrical mark and space pulses forming coded characters and including a start pulse, magnetic drum storage means, and control circuitry means interconnecting the magnetic drum storage means and the teletypewriters, the control circuitry means being operative in response to incoming signals to temporarily record the mark and space information of each coded character, on the magnetic drum storage means, in a parallel form, wherein the control circuitry means includes a write counter responsive to the recording of each character as it is stored, a master counter responsive to a timing track on the magnetic drum storage means for repeatedly counting the drum segments, and write-comparator means responsive to the coincidence of the write counter and master counter counts for generating a write-comparator signal indicative of the coincidence.

2. Apparatus according to claim 1 wherein the control circuitry means includes a serial-to-parallel converter for converting the incoming mark and space coded information to a parallel form, write control means and write amplifier means for recording the incoming information on the magnetic drum storage means in a parallel manner.

3. Apparatus according to claim 2 wherein the write control means includes a write enable circuit responsive to the incoming start signal for generating a clear-to-write signal, and AND means responsive to the coincident occurrence of the clear-to-write signal and the write-comparator signal for generating a write-control signal which is connected to the write amplifier means so as to record the mark and space information from each coded character on a segment of the magnetic drum storage means in a parallel manner with each succeeding character being recorded on the segment of the drum adjacent the segment of the previous recording.

4. Apparatus according to claim 1 wherein the control circuitry means includes a read counter responsive to a read-pulse generated whenever a character has been read from the drum and applied to the using device, and read comparator means responsive to the coincidence of the read counter and master counter counts for generating a read-comparator signal indicative of the coincidence.

5. Apparatus according to claim 4 wherein the control circuitry means includes a read enable circuit responsive to the read-pulse to generate a shaped read-pulse and AND means responsive to the coincident occurrence of the shaped read-pulse and the read-comparator signal for generating a read-stroke signal.

6. Apparatus according to claim 5 wherein the control circuitry means includes a read amplifier means responsive to the recorded information on the magnetic drum and AND means responsive to the coincident occurrence of the read amplifier means output and the read-strobe signal for transmitting the parallel recorded character information to one or more receiving devices.

7. Apparatus according to claim 1 wherein the control circuitry means includes a master counter, read and write counter, read and write comparators, and read and write amplifier means, the master counter being responsive to a timing track on the magnetic drum for continuously indicating the magnetic drum segment then proximate the read and write amplifier means, the read and write counters being responsive respectively to the recording of the input information and the reading of output information from the drum to keep a continuous count of the drum segments in which information has been recorded, the read and write comparators providing control signals for gating the read and write amplifier means so the characters are recorded into sequential segments of the magnetic drum so that characters are read out in the same sequence as recorded.

8. Apparatus according to claim 7 wherein the start signal repetition frequency may differ from the read signal repetition frequency so that characters are read out at a rate different from the recording rate.

References Cited

UNITED STATES PATENTS

| | | | |
|---|---|---|---|
| 3,319,230 | 5/1967 | Astrahan et al. | 340—172.5 |
| 3,181,124 | 4/1965 | Hammel | 340—172.5 |
| 3,181,123 | 4/1965 | Wright et al. | 340—172.5 |
| 3,117,306 | 1/1964 | Reitfort | 340—172.5 |
| 2,910,238 | 10/1959 | Miles et al. | 235—167 |

PAUL J. HENON, *Primary Examiner.*

GARETH SHAW, *Assistant Examiner.*